(12) United States Patent
Breton et al.

(10) Patent No.: US 10,745,205 B2
(45) Date of Patent: Aug. 18, 2020

(54) SANITARY MONOPIECE CAGE-BAR FOR DIRECT DRIVE SPIRAL CONVEYOR

(71) Applicant: AMF Automation Technologies, LLC, Sherbrooke, Quebec (CA)

(72) Inventors: Matthieu Breton, Sherbrooke (CA); Daniel Ferland, Sherbrooke (CA); Eric Gilbert, Sherbrooke (CA); Bobby Martin, Sherbrooke (CA); Charles Perreault, Sherbrooke (CA); Marc-Olivier Thibault, Sherbrooke (CA)

(73) Assignee: AMF Canada LLC, Sherbrooke, Quebec (CA)

( * ) Notice: Subject to any disclaimer, the term of this patent is extended or adjusted under 35 U.S.C. 154(b) by 161 days.

(21) Appl. No.: 15/751,903

(22) PCT Filed: Aug. 10, 2016

(86) PCT No.: PCT/CA2016/050936
§ 371 (c)(1),
(2) Date: Feb. 12, 2018

(87) PCT Pub. No.: WO2017/024403
PCT Pub. Date: Feb. 16, 2017

(65) Prior Publication Data
US 2018/0273301 A1    Sep. 27, 2018

Related U.S. Application Data

(60) Provisional application No. 62/203,099, filed on Aug. 10, 2015.

(51) Int. Cl.
*B65G 21/18* (2006.01)
*B65G 21/16* (2006.01)

(52) U.S. Cl.
CPC .......... *B65G 21/18* (2013.01); *B65G 2201/02* (2013.01)

(58) Field of Classification Search
None
See application file for complete search history.

(56) References Cited

U.S. PATENT DOCUMENTS 4,852,720 A * 8/1989 Roinestad ............. B65G 21/18
198/778
5,105,934 A * 4/1992 Cawley ................. B65G 21/18
198/778

(Continued)

*Primary Examiner* — Kavel Singh
(74) *Attorney, Agent, or Firm* — Brouillette Legal Inc

(57) ABSTRACT

A drive member for a cage of a spiral conveyor, the drive member comprising a cage-bar and an engagement member. The cage-bar comprises a ridge extending along a longitudinal axis of the cage-bar, the ridge being adapted to mate with an inner side of a conveyor belt. The cage-bar has a conical shape and a driving ridge in a single part with coating to protect against wear. At the belt entrance of the spiral conveyor, the sanitary monopiece direct drive cage-bar have an UHMW (Ultra-High-Molecular-Weight) polyethylene bloc overlapped to help engagement of the belt as specified by manufacturer of the belt. The custom bended shape of the cage-bar allows using several different conical angles to reduce belt tension. The monopiece cage-bar also allows applications where great temperature changes are required because the thermal dilatation will not causes gap in the driving ridge.

13 Claims, 3 Drawing Sheets

(56) References Cited

U.S. PATENT DOCUMENTS

| | | | | |
|---|---|---|---|---|
| 5,137,141 A | * | 8/1992 | Irwin | B65G 17/086 |
| | | | | 198/778 |
| 5,310,045 A | * | 5/1994 | Palmaer | B65G 17/086 |
| | | | | 198/778 |
| 9,079,719 B2 | * | 7/2015 | Talsma | B65G 21/18 |

* cited by examiner

SANITARY MONOPIECE CAGE-BAR FOR DIRECT DRIVE SPIRAL CONVEYOR

CROSS-REFERENCE TO RELATED APPLICATIONS

The present patent application claims the benefits of priority of commonly assigned U.S. provisional Patent Application No. 62/203,099, entitled "Sanitary Monopiece Cage-Bar For Direct Drive Spiral Conveyor" and filed at the United States Patent and Trademark Office on Aug. 10, 2015, the content of which is incorporated herewith by reference.

FIELD OF THE INVENTION

The present invention generally relates to power-driven conveyors and more particularly to spiral conveyors in which a conveyor belt is positively driven in a helical path around a rotating drive cage thanks to a spiral conveyor cage-bar that allows driving the belt on direct drive systems.

BACKGROUND OF THE INVENTION

Positively driven spiral systems, in which drive structure on the outside of a rotating cage engages structure on the inside of a conveyor belt, have been used to convey articles, such as foodstuffs and other materials, through cooled or heated environments. Spiral conveyors, in which a conveyor belt follows a helical path winding around a central tower, drum, or cage, are used in freezers, coolers, proofers and ovens to provide a long conveying path with a small footprint. Cage-bars extending from the top of the central cage to the bottom are spaced apart circumferentially and form the outside of the cage.

As disclosed in U.S. Pat. No. 8,181,771 (Talsma), metal cage-bars form a drive structure that drives the belt. Because there is positive engagement between the regularly spaced drive structure on the cage and regularly spaced edge structure on the inside edge of the belt, there is no slip as in overdrive spiral systems. No additional tensioning is needed and frictional losses are less.

However, prior art positively driven spiral systems have difficulties in cleanly engaging the belt and disengaging it from the drive structure on the cage. To help solve that problem, the cage-bars have a ridge of varying height at the entrance of the conveyor belt into the rotating cage.

There is however a need to provide an improved cage-bar that has the objective to convey a smooth surface, the smooth surface aiming at providing a more sanitary device. It is also a need to provide a more flexible cage-bar with regards with the conical shape of the central cage (?) and less wear-prone. Another objective of the present invention is to propose an improved cage-bar that would be less expensive to manufacture.

SUMMARY OF THE INVENTION

The invention is directed to a drive member to be operatively mounted on a circumference of a spiral conveyor drive cage for engaging a conveyor belt, the drive member comprising a monopiece cage-bar having a first end and a second end. The monopiece cage-bar defines a first portion longitudinally extending from the first end to a second portion longitudinally extending from the second end, the first and second portions defining an angle therebetween, a front surface and a rear surface, extending from the first end to the second end, a ridge extending longitudinally between the first and second ends protruding from the front surface for engaging the conveyor belt. The drive member also comprises an engagement member operatively mounted to the second end for guiding the conveyor belt into positive engagement with the ridge.

According to a preferred embodiment, the second end of the monopiece cage-bar comprises a slot extending between the front and rear surfaces for receiving the engagement member.

Still in accordance with a preferred embodiment, the engagement member, which is preferably made of a plastic material, such as but not limited to Ultra-High-Molecular-Weight polyethylene, comprises a support member adapted for being operatively mounted to the rear surface of the cage-bar, a filling member protruding from the support member and adapted to be inserted and fit the slot; the filling member defining a tip end outwardly protruding from the filling member for matching an extremity of the ridge, and an alignment member outwardly protruding from the filling member below and circumferentially offset from the tip end. The alignment member is cooperating with the tip end for guiding an inner side of the conveyor belt into positive engagement with the ridge.

Preferably, a smooth transition is provided between the first and second portions of the cage-bar and the angle between the first and second portions is selected to provide a given tension in the conveyor belt. The monopiece cage-bar preferably has a U-shape cross-section and is preferably coated with a wear-resistant coating.

In accordance with a preferred embodiment, the monopiece cage-bar, which is preferably made of a metallic material, is manufacture with an extrusion process of a matrix. The angle between the first and second portions is preferably made from a die.

Still according to a preferred embodiment, the rear surface of the cage-bar comprises attachment members, preferably adjacent to the first end and to the second end, for attaching the monopiece cage-bar to the spiral conveyor drive cage providing as such the front surface of the cage-bar free of sharp edges. The attachment members are preferably apertures defined within a thickness of the cage-bar and adapted to receive fasteners.

The invention is also directed to a maintenance method of a drive member operatively mounted on a circumference of a spiral conveyor drive cage for engaging a conveyor belt, the drive member comprising a monopiece cage-bar defining a ridge longitudinally extending on a front surface of the monopiece cage-bar for engaging the conveyor belt, and an engagement member operatively mounted to a second end of the cage-bar for guiding the conveyor belt into positive engagement with the ridge. The method comprises the steps of:

a) determining that the engagement member is worn and needs to be changed;
b) detaching the engagement member from a rear surface of the monopiece cage-bar, the monopiece cage-bar remaining attached to the drive cage; and
c) attaching a new engagement member to the rear surface of the monopiece cage-bar.

In accordance with a preferred embodiment, the method further comprises the steps of:
pulling the engagement member away from the monopiece cage-bar after the step b) of detaching the engagement member; and pushing the engagement member toward the monopiece cage-bar before the step of attaching the new engagement member.

Preferably, the engagement member is pulled, and the new engagement member is pushed, following a longitudinal axis of the monopiece cage-bar.

Still according to a preferred embodiment, the replacement of the engagement member preferably comprises the steps of removing fasteners from behind the engagement member and dragging the engagement member down along the longitudinal axis of the cage-bar. Also, the engagement and the new engagement members are preferably operatively mounted to the drive cage and to the monopiece cage-bar using fasteners.

The method preferably further comprises the step of applying a wear-resistant coating to the new engagement member.

The invention is also directed to a spiral conveyor comprising a drive-cage engaging a conveyor belt, the drive-cage of the spiral conveyer comprising at plurality of drive members as defined herein above.

One feature of the invention is the simplification of the design to a single piece cage-bar called monopiece cage-bar and an engagement bloc. This simplification to two parts (monopiece cage-bar and bloc) aims at reducing manufacturing costs. To realize this, the monopiece cage-bar shape is in a first step extruded from a mold. Then, it is bent with a custom die to form a conical shape to a selected angle. Finally, a slot is machined to insert the engagement bloc in the monopiece cage-bar.

A second feature to this innovation is the sanitary aspect of the monopiece cage-bar. By reducing the quantity of piece, the quantity of contact surfaces where bacteria and food contamination can develop and grow is also reduced. This lead to a significant increase in the sanitary aspect of the cage-bar which is required in applications like freezers or in meat and poultry product.

A third feature to this innovation is the ability to form the cage-bar with a custom die preferably in a single step to the required conical angle specified by the manufacturer to reduce belt tension.

Finally, the monopiece cage-bar preferably does not present junction with a gap regardless of the temperature difference because it is preferably made of a single piece. This feature allows use in application such as freezer where delta of temperature is great.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel Sanitary Monopiece Cage-Bar for Direct Drive Spiral Conveyor will be described hereinafter. Although the invention is described in terms of specific illustrative embodiment(s), it is to be understood that the embodiment (s) described herein are by way of example only and that the scope of the invention is not intended to be limited thereby.

Figure 1:
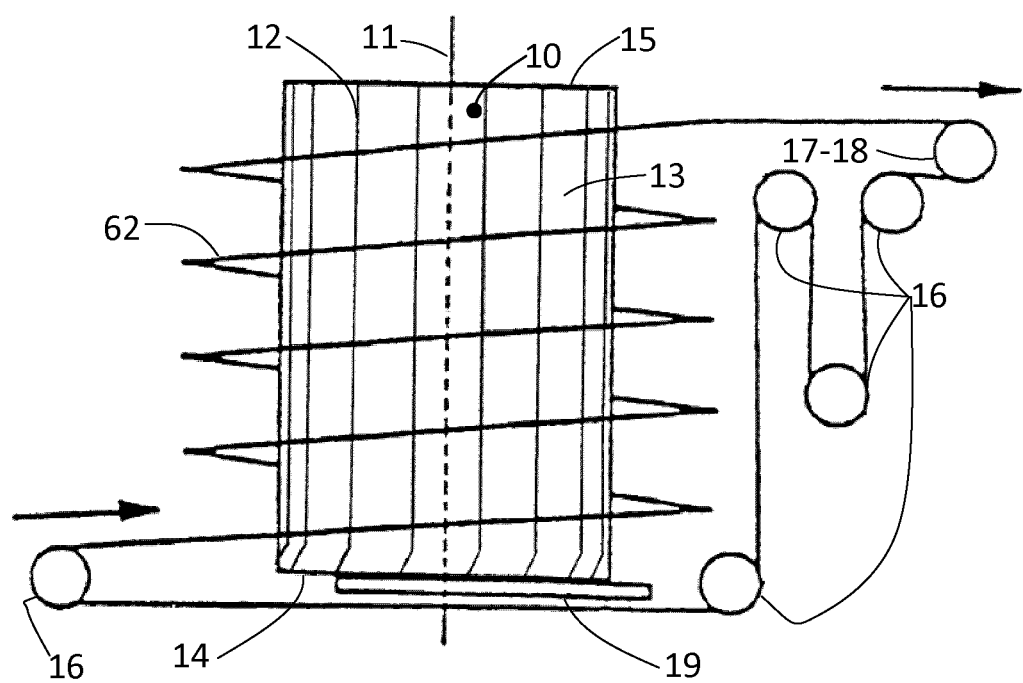
FIG. 1 is a side elevation schematic of a typical positively-driven spiral conveyor system according to the prior art.
Figure 2:
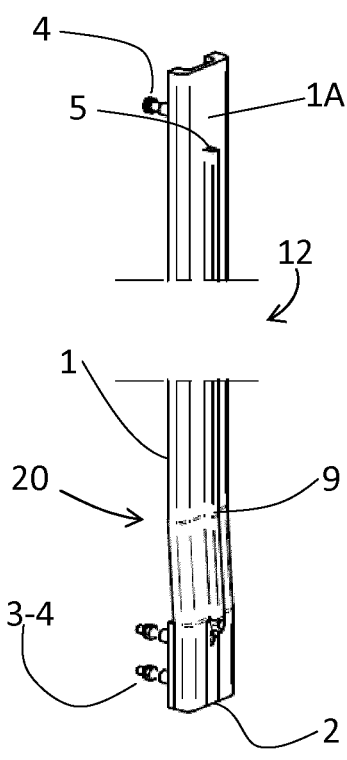
FIG. 2 is an isometric view of the drive member including in accordance with the principles of the present invention.
Figure 3:
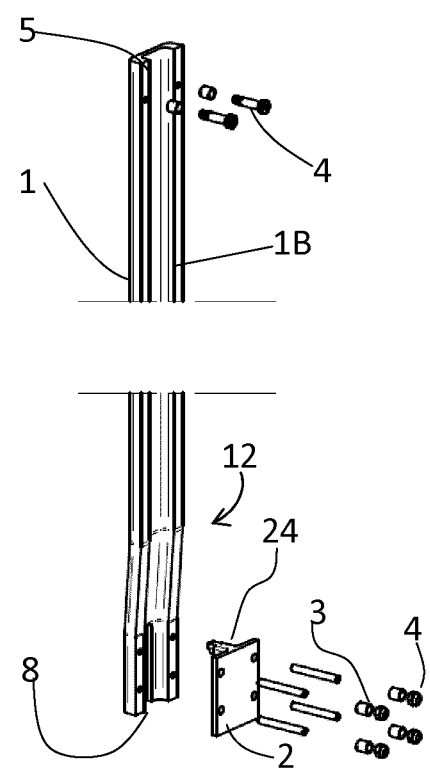
FIG. 3 is an exploded view of the drive member FIG. 2.
Figure 4:
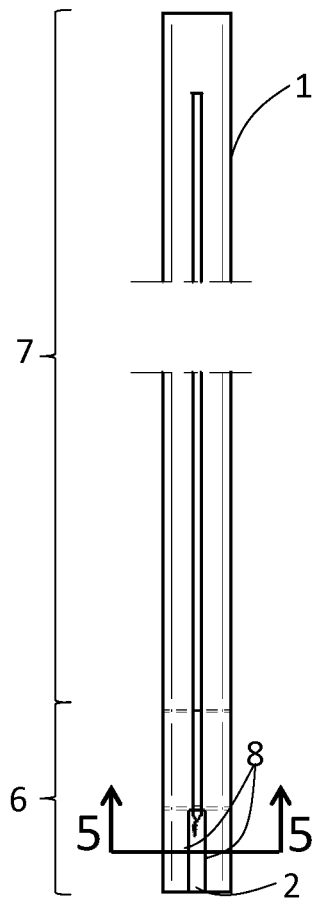
FIG. 4 is a front view of the drive member of FIG. 2.

Referring to FIG. 1 where a spiral conveyor is schematically illustrated. Typically, the spiral conveyor includes a drive tower preferably in the form of a cylindrical cage 10 that is driven to rotate about a vertical axis 11. The rotating cage 10 has a plurality of parallel, generally vertical drive members 12 spaced apart regularly around its periphery 13. Each drive member 12 preferably extends in length between the bottom 14 and the top 15 of the cage 10. The conveyor belt 62 follows a multi-tiered helical path around the cage. The path is defined by a helical carry way.

Typically, the inside edge of the belt positively engages the drive members 12, which drive the belt 62 up the cage as it rotates. The belt 62 travels around various take-ups 17, idle, and/or feed sprockets 16 as it makes its way from the exit at the top of the cage and back to the entrance at the bottom. The take-up sprockets 17 engage the belt 62 after its exit from the helical path. The sprockets may be driven by a constant-torque motor 18 to prevent speed mismatches between the cage and the motor 18 which may cause the belt to bunch up as it exits the helical path. The constant-torque motor 18 is preferably adapted to auto-adjusts itself to any speed changes, such as those caused by temperature or other environmental changes. Systems known in the art may be used to achieve that purpose without departing from the scope of the present invention. The cage 10 is preferably mounted at its bottom to a base 19 and is rotated by a motor and gears (not shown).

Now referring to FIGS. 2-7, where the drive member 12 is illustrated. The present invention aims at simplifying the design. The drive member 12 preferably comprises two main pieces: a cage-bar referred to as a monopiece cage-bar 1 and an engagement member referred to as an engagement bloc 2. This simplification to two parts (monopiece cage-bar 1 and engagement bloc 2) has the objective to reduce production costs. To realize this, the monopiece cage-bar 1 shape is in a first step preferably extruded from a matrix. The monopiece cage-bar is preferably made from a metallic material, such as but not limited to aluminum and stainless steel, but any other suitable material may be used without departing from the scope of the present invention. The next step consists in bending the monopiece cage-bar 1 using a custom die to form a tapered shape to a selected angle. Such tapered shape has to objective to facilitate the engagement and disengagement of the belt from the drive member 12. A third step would be to machine a slot 8. The slot 8 allows the insertion of the engagement bloc 2 in the monopiece cage-bar 1. The cage-bar 1 preferably has a "U"-shape cross section to increase rigidity along its longitudinal axis. The cage-bar, because it is a monopiece cage-bar, is well suited in applications where great temperature changes are required because the thermal dilation will not cause a gap.

Preferably, each of the drive members 12 comprises a monopiece sanitary cage-bar 1 including an engagement bloc 2, which is affixed at the bottom 14 of the cage to a lower ring 64. The remaining extremity of the monopiece cage-bar 1 is preferably affixed to the top 15 of the cage 10.

The monopiece cage-bar 1 preferably comprises two portions, a conical, or tapered portion 6 and a straight portion 7. The angle between the tapered 6 and straight 7 portions may be varied in the manufacturing process to comply with specifications regarding the tension in the belt 62. The junction area 20 between the tapered 6 and straight 7 portions is preferably smooth because it is created by bending the extruded cage-bar 1. This has the objective to facilitate the transition of the belt 62 between the tapered portion 6 and straight portion 7 as the belt 62 is going up the cage 10. The monopiece cage-bar 1 and the engagement bloc 2 may be coated with a wear resistant coating depending on the required specification or operating conditions to increase durability.

The monopiece cage-bar 1 also comprises a ridge 5 whose longitudinal axis is parallel to the longitudinal axis of the cage-bar 1. The ridge 5 is adapted to engage an inner side of the belt 62 for positively driving said belt along the helical path. The ridge 5 preferably protrudes from a front surface 1A of the monopiece cage-bar 1. The ridge 5 may be welded to the front surface 1A of the monopiece cage-bar 1 or it is preferably created during the extrusion process. In another embodiment, the ridge 5 may be the result of a machining process.

Still referring to FIGS. 2 to 7, the monopiece cage-bar 1 has a recess or slot 8 for receiving an engagement member 2. Preferably, the engagement member may be replaced when required. The engagement member comprises a support member 2A and a filling member 2B protruding from the support member 2A. The filling member 2B is adapted to fill the recess or slot 8. In a preferred embodiment, the engagement member bloc 2 is inserted from a rear surface 1B of the monopiece cage-bar 1 toward the front surface.

A triangular tip member referred to as a tip end 65 protrudes from the filling member 2B. A top section 24 of the tip end 65 preferably corresponds to a cross section of the ridge 5 to allow a smooth transition therebetween.

The engagement bloc 2 also preferably comprises an alignment member, referred to as a bump 61. The bump 61 protrudes from the filling member and is preferably laterally offset from the longitudinal axis of the ridge 5 and located below the ridge 5. The bump 61 cooperates with the tip end 65 to guide the inside edge of the conveyor belt 62 into positive engagement with a drive face 9 of the ridge 5.

Figure 7:
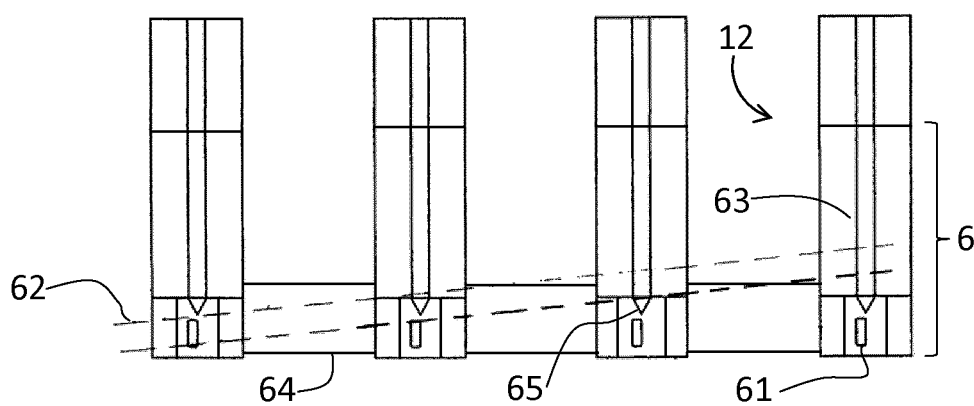
FIG. 7 is a side elevation schematic view of the engagement of the belt with the drive member of FIG. 2.

Referring now to FIG. 7 where the engagement of the belt 62 with the monopiece cage-bar 1 is schematically illustrated. To facilitate engagement of the belt 62 with the ridge 5, the monopiece cage-bar has a tapered portion 6 at the entrance of the conveyor belt onto the rotating cage. The bump 61 thus aims at helping guiding the belt rows into engagement with the drive face 9 of the ridge 5 of the drive member 12.

Still referring to FIG. 7, the bump 61 and the tip end 65 are prone to wear because of continuous friction or impact with the belt 62 has it is engaged. The engagement bloc 2 is thus separated from the cage-bar 1 to avoid replacing the whole drive member 12. When required, only the engagement bloc 2 is removed and replaced. Such embodiment aims at reducing operation costs.

The engagement bloc 2 is preferably made form Ultra-High-Molecular-Weight polyethylene, but any other material known in the art may be used without departing from the scope of the invention.

Figure 5:
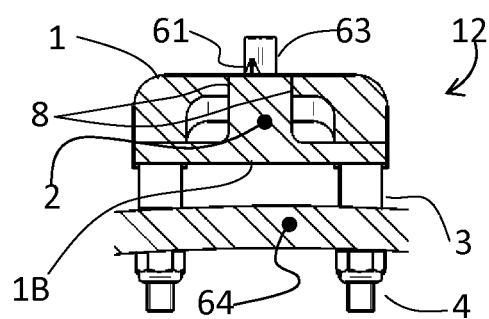
FIG. 5 is the cross-section view following line 5-5 of FIG. 4.
Figure 6:
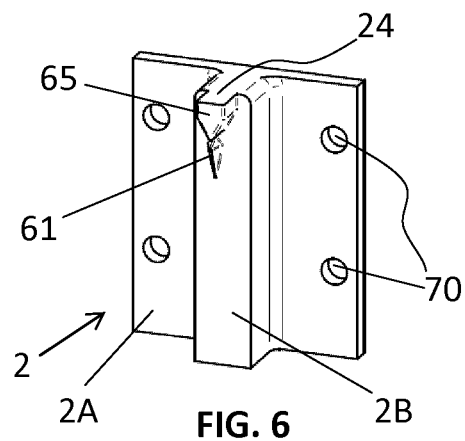
FIG. 6 is a perspective view of the engagement member in accordance with the principles of the present invention.

FIG. 5 illustrates a cross-section view along line 5-5 of the drive member 12 installed on the lower ring 64. The engagement bloc 2 is preferably installed on the lower ring 64 from behind (interior of the cage 10) and is preferably adjacent from the rear surface 1B of the mono piece cage-bar 1. The objective is to provide a surface free of sharp edges since the fasteners such as bolts 4 protrudes inwardly from the rear surface 1B, thus away from the belt 62. The replacement of the engagement bloc 2 preferably comprises the steps of removing the bolts 4 from behind and dragging the bloc 2 down along the longitudinal axis of the cage-bar 1. Spacers 3 may be used to fill the radial gap between the lower ring 64 and the tapered portion 6. Any other means known in the art, such as clips, may be used to attach the engagement bloc 2 to the cage 10 without departing from the scope of the present invention.

The disclosed embodiment has the objective to improve the sanitary aspect of spiral conveyors by reducing the quantity of pieces. By limiting the number of pieces, the quantity of contact surfaces where bacteria and food contamination can develop and grow is also reduced. This has the objective to increase in the sanitary aspect of the cage-bar which is required in applications like freezers or in applications where meat and poultry product are manipulated.

Although the invention has been described with references to an up going spiral conveyor, the conical bended portion, or tapered portion, of the cage-bar could be located upside down at the top of the cage in a down going spiral conveyor without departing from the scope of the present invention.

Also, the cage-bar may be manufactured by other processes, such as, but not limited to, soldering, moulding, and/or machining as long as a transition between the tapered portion 6 and the straight portion 7 is smooth. The ridge 5 may also be created using any means known in the art as long as the junction between the ridge 5 and the front surface 1A of the cage-bar 1 is preferably smooth. The smooth transition and junction 20 have the objective of limiting areas where bacteria may grow or residue may remain stuck.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A drive member to be operatively mounted on a circumference of a spiral conveyor drive cage for engaging a conveyor belt, the drive member comprising:
   a monopiece cage-bar having a first end and a second end, the monopiece cage-bar defining:
      a first portion longitudinally extending from the first end and a second portion longitudinally extending from the second end, the first and second portions being contiguous at an angle to each another, the angle being greater than 0°;
      a front surface and a rear surface, extending from the first end to the second end; and
      a ridge forming part of the monopiece cage-bar and extending longitudinally between the first and second ends, the ridge protruding from the front surface for engaging the conveyor belt, and an engagement member operatively mounted to the second portion for guiding the conveyor belt into positive engagement with the ridge.

2. The drive member according to claim 1, wherein the second end of the monopiece cage-bar comprises a slot extending between the front and rear surfaces for receiving the engagement member.

3. The drive member according to claim 2, wherein the engagement member comprises:
- a support member adapted for being operatively mounted to the rear surface of the cage-bar;
- a filling member protruding from the support member and adapted to be inserted and fit the slot; the filling member defining a tip end outwardly protruding from the filling member for matching an extremity of the ridge; and
- an alignment member outwardly protruding from the filling member below and circumferentially offset from the tip end;

the alignment member cooperating with the tip end for guiding an inner side of the conveyor belt into positive engagement with the ridge.

4. The drive member according to claim 1, wherein a smooth transition is provided between the first and second portions of the cage-bar.

5. The drive member according to claim 1, wherein the angle between the first and second portions is selected to provide a given tension in the conveyor belt.

6. The drive member according to claim 1, wherein the monopiece cage-bar has a U-shape cross-section.

7. The drive member according to claim 1, wherein the cage-bar is coated with a wear-resistant coating.

8. The drive member according to claim 1, wherein the engagement member is made of Ultra-High-Molecular-Weight polyethylene.

9. The drive member according to claim 1, wherein the monopiece cage-bar is made from an extrusion process of a matrix and wherein the angle between the first and second portions is made from a die.

10. The drive member according to claim 1, wherein the rear surface of the cage-bar comprises attachment members for attaching the monopiece cage-bar to the spiral conveyor drive cage providing as such the front surface of the cage-bar free of sharp edges.

11. The drive member according to claim 10, wherein the attachment members are adjacent to the first end and to the second end.

12. The drive member according to claim 10, wherein the attachment members are apertures defined within a thickness of the cage-bar and adapted to receive fasteners.

13. The drive member according to claim 1, wherein the monopiece cage-bar comprises a third portion being contiguous at an angle greater than 0° to the first portion and being contiguous at an angle greater than 0° to the second portion.

* * * * *